(12) United States Patent
Wang et al.

(10) Patent No.: US 12,398,058 B2
(45) Date of Patent: Aug. 26, 2025

(54) SLUDGE TREATMENT SYSTEM USING A HORIZONTAL DRAIN BOARD WITH A MULTI-LAYER GEOTEXTILE BAG

(71) Applicant: Wenhou University, Wenzhou (CN)

(72) Inventors: Jun Wang, Wenzhou (CN); Hongtao Fu, Wenzhou (CN); Yuanqiang Cai, Wenzhou (CN); Shihu Gao, Wenzhou (CN); Guohui Yuan, Wenzhou (CN); Peng Wang, Wenzhou (CN); Chuan Gu, Wenzhou (CN); Lin Guo, Wenzhou (CN); Junfeng Ni, Wenzhou (CN); Xiuqing Hu, Wenzhou (CN); Ziyang Gao, Wenzhou (CN); Rila Anda, Wenzhou (CN); Xiaoxiao Zhu, Wenzhou (CN)

(73) Assignee: Wenhou University, Wenzhou (CN)

( * ) Notice: Subject to any disclaimer, the term of this patent is extended or adjusted under 35 U.S.C. 154(b) by 544 days.

(21) Appl. No.: 17/477,567

(22) Filed: Sep. 17, 2021

(65) Prior Publication Data
US 2023/0089532 A1    Mar. 23, 2023

(51) Int. Cl.
*C02F 11/128* (2019.01)
*C02F 11/14* (2019.01)

(52) U.S. Cl.
CPC ............ *C02F 11/128* (2013.01); *C02F 11/14* (2013.01); *C02F 2201/004* (2013.01); *C02F 2301/063* (2013.01)

(58) Field of Classification Search
None
See application file for complete search history.

(56) References Cited

U.S. PATENT DOCUMENTS

2022/0341116 A1*  10/2022  Cai ........................... E02D 3/12

\* cited by examiner

*Primary Examiner* — Hayden Brewster

(57) ABSTRACT

In the invention, a sludge treatment technology adopting flocculation-horizontal drain board vacuum preloading combining multi-layer sealed geotextile bag is disclosed, which comprises sealed geotextile bags and a geomembrane for sludge grouting and filling. The sealed geotextile bag and the geomembrane have two splicing modes, one is to place a layer of geomembrane inside and close to the inner side of the sealed geomembrane; the other is to wrap and seal the outside of the geotextile with geomembrane. A horizontal drainage system for vacuum drainage is set inside the sealed geotextile bag, with one end of the horizontal drain board being connected to a vacuum drainage pipe, and the drainage pipe passes through the sealed geotextile bag via a flange and is connected to the vacuum pump used for pumping the water in the sealed geotextile bag. Sludge includes engineering waste mud, river sludge and industrial sludge. A horizontal drainage system is added inside the sealed geotextile bag and combining with flocculant for sludge dewatering, and the sealed geotextile bag can be stacked in several layers to form a stacking effect on the lower structure through the self weight of the upper layer, thus making the drainage effect faster and the dewatering efficiency higher.

7 Claims, 12 Drawing Sheets

SLUDGE TREATMENT SYSTEM USING A HORIZONTAL DRAIN BOARD WITH A MULTI-LAYER GEOTEXTILE BAG

BACKGROUND OF INVENTION

1. Field of the Invention

The invention involves the technical field of vacuum preloading method and water drainage with sealed geotextile bag, in particular, a sludge treatment technology using flocculation-horizontal drain board vacuum preloading combining with multi-layer sealed geotextile bag. The invention also involves a rapid sludge treatment method implemented by using flocculation-horizontal drain board vacuum preloading combining with multi-layer sealed geotextile bag.

2. Description of Related Art

In many construction projects, one of the most common challenges is the treatment of river sludge and engineering waste mud. Due to their high moisture content, low strength, and high fluidity, these materials are particularly difficult to handle. If not properly treated, they can significantly delay construction progress and pose serious environmental risks.

The existing treatment method of sealed geotextile bags is widely used. The sealed geotextile bag is a large membrane bag and inclosure made of high-strength geotextile, and its diameter can be changed according to needs. Sealed geotextile bag was first used in embankment engineering, and then slowly applied in environmental protection, agriculture and so on. At present, it is also used in some sludge treatment projects, However, ordinary sealed geotextile bags have some inherent defects in the treatment of pipeline sludge and engineering waste mud: Firstly, water is drained depending on natural deposition of mud and the stacking of sealed geotextile bags, which has a cycle of one to two months, the speed is too slow and the dehydration effect is not obvious enough, so it is unable to quickly treat the waste mud produced in the project, thus will have a certain impact on the construction period, which also increases a certain time cost and economic cost. Secondly, only the sealed geotextile bag itself is used for mud treatment, and the discharged water is turbid and cannot be reused, so it needs to be treated intensively. Thirdly, the ordinary sealed geotextile bag can only be used once, the manufacturing process is complex, the consumption of resources is large, and it is not environmentally friendly, so it is necessary to study a new drainage method with multi-layer sealed geotextile bags.

The invention mainly comprises a device for dewatering river sludge and waste mud by using flocculation-horizontal drain board vacuum preloading combining with multi-layer sealed geotextile bag. In the process, the production process in industrialized assembly line is adopted, which greatly shortens the time for manual sewing of woven bags and saves a lot of time cost and economic cost. Secondly, the horizontal drainage system is added inside with a horizontal drainage system combining with flocculant to dehydrate the mud, so the drainage effect is better and faster, and the dehydration efficiency is higher, which is very suitable for the treatment of engineering waste mud and industrial sludge.

SUMMARY OF THE INVENTION

One of the technical problems to be solved by the invention is to provide a sludge drying system using horizontal drain board vacuum preloading with a multi-layer geotextile bag. The sludge drying system is intended to provide effective and rapid treatment, and the horizontal drainage system can be manufactured on an industrial assembly line, which is simple and fast, and can greatly improve the drainage rate. A multi-layer geotextile bags can be stacked to help accelerate drainage, and can be reused to reduce cost. Another technical problem to be solved by the invention is to provide a sludge drying treatment method of a sludge drying system using horizontal drain board with a multi-layer geotextile bags.

For this purpose, the invention provides a sludge treatment technology using flocculation-horizontal drain board vacuum preloading combining with multi-layer sealed geotextile bags, which comprises a horizontal drain board system and sealed geotextile bags. A horizontal geotextile for fixing the drain board is set in the sealed geotextile bag, which is horizontally set in the middle of the sealed geotextile bag and separates it into an upper cavity and a lower cavity. The said sealed geotextile bag is set with an upper grouting port and a lower grouting port respectively that are opened through and connected with the upper cavity and the lower cavity. The upper grouting port and the lower grouting port are equipped with covers that can be opened and closed. The said horizontal drain board system includes a drain board and a pipeline system. The said drain board is pasted and fixed on the horizontal geotextile, and the said sealed geotextile bag forms an air seal and a liquid seal after being closed. At least one end of the drain board is connected to the pumping and drainage device through a piping system.

More particularly wherein the drain board system comprises two layers of horizontal geotextiles, and the said drain board is set between the two layers of horizontal geotextiles and in the center of the sealed geotextile bag.

More particularly wherein the horizontal drain board system comprises two layers of horizontal geotextiles, the said drain board, vacuum probe, vacuum pipe, drainage pipe and hand joint, and the said drain board is set between the two layers of horizontal geotextiles, the inner end of the said sealed geotextile bag is connected with one end of the geogrid, the other end of the geogrid is connected with the outer interface of the sealed geotextile bag to isolate sludge into upper and lower areas, the drain board wrapped in the said horizontal geotextile is fixed on the said geogrid, and one end of the horizontal geotextile is connected with one end of the geogrid, the other end of the geogrid is connected to the outer interface of the sealed geotextile bag. After the geogrid and the outer interface of the sealed geotextile bag is sewn with a professional sewing machine, a circle of waterproof glue is wrapped on the outside. The vacuum probe passes through the sealed geotextile bag and enters the inner cavity, the vacuum pipe is connected with the hand joint, and the hand joint is set on the said sealed geotextile bag as an inlet and outlet to communicate internally and externally. The said drainage system is laid in the center of the sealed geotextile bag and isolates the sealed geotextile bag into upper and lower areas.

More particularly wherein a layer of geomembrane is placed inside the said sealed geotextile bag, the geomembrane is close to the inner side of the sealed geotextile bag, and they are pasted together with a professional hot melt machine; or, the said geomembrane wraps and seals the outside of the geotextile bag, so that the whole device becomes an integral structure, thus forming a complete drainage system to ensure the tightness of the device and improve the drainage performance. Or, the said sealed geotextile bag is made of high-strength impermeable and air-tight geosynthetic material.

More particularly wherein in the horizontal drain board system, the vacuum probe is fixed with the vacuum pipe, and then fixed on the drain board with iron wire to measure the vacuum degree in the drain board. One end of the said drain board is fixed on the lower-layer horizontal geotextile, the other end is connected with a hand joint, and then the two are locked together through a fixing device, and the other end of the hand joint is connected with a drainage pipe, and the drainage pipe is connected with a main drainage pipe to the outside; Each horizontal drain board system is composed of a combination structure of several drain boards and hand joints. The upper and lower parts of the drain board are wrapped with two complete rectangular horizontal geotextiles, and the two horizontal geotextiles are sewn and completely sealed with a sewing machine around to form an integral structure; Two flanges are installed above the said sealed geotextile bag, one of which is connected with a mud branch pipe to the lower part of the horizontal drain board system for mud injection, and the other is connected with a sludge branch pipe to the upper part of the horizontal drain board system for mud injection. The flange includes an upper flange and a lower flange. The upper flange and the lower flange clamp the edge of the through hole at the sealed geotextile bag and form a flange connection.

More particularly wherein an intermediate frame is set in the said sealed geotextile bag, an intermediate geotextile is fixed on the intermediate frame, and an upper geotextile and a lower geotextile are respectively fixed on the upper and lower sides of the intermediate frame. At least one side between the upper geotextile and the lower geotextile is set with an openable lateral opening, a batten is set fixedly at the upper geotextile and the lower geotextile at the lateral opening, an upper batten groove and a lower batten groove corresponding to the batten are set at the corresponding sides of the said middle frame, elastic sealing strips are set in the upper batten groove and the lower batten groove, and several bolt holes pass through the upper batten, intermediate frame and lower batten.

More particularly wherein the said upper geotextile and the lower geotextile are connected on only one side, the three sides of the said upper geotextile and the lower geotextile form the said lateral opening, the said batten is in a U shape, and the said upper batten groove and the lower batten groove are in a U shape matching the batten. The said sealed geotextile bag is composed of more than three layers of sub-bags, the adjacent sub-bags are separated by a common geotextile, each of the sub-bags has a lateral opening, and the lateral openings of the adjacent sub-bags are opposite.

More particularly wherein a batten and a batten groove are set at the opening of each sub-bag, an elastic sealing strip is set in the batten groove, several bolt holes pass through the upper batten and batten groove, and a connecting piece is set at the bolt hole. There are an outer hole and an inner hole on the connecting piece. The screw passes through the inner hole to fix the said connecting piece on the batten. The two sides of each sealed geotextile bag are set with vertical rods, the outer holes of the connecting piece are sleeved on the vertical rod. The said vertical rod is sleeved with counterweight blocks, there are socket holes at both sides of the counterweight blocks, and the vertical rods pass through the socket holes so that the counterweight blocks accurately press down on the sealed geotextile bag.

A rapid sludge treatment method implemented by adopting flocculation-horizontal drain board vacuum preloading combining with multi-layer sealed geotextile bag, which is characterized in that: it comprises the following steps:

(1) Adopt a mechanical equipment assembly line to prefabricate the horizontal drain board system, and make the system into a unified specification according to the site requirements and reserved for use;

(2) Process and make the said sealed geotextile bag, which is a multi-layer sealed geotextile bag. Fix the horizontal drain board system or a single horizontal drain board in the middle of the sealed geotextile bag by using a geogrid. Install the flange and mud branch pipe above the multi-layer sealed geotextile bag, and process and seal according to the required specifications, and then sleeve a layer of geomembrane on the outside, or use a professional hot melt machine to paste the geomembrane on the inner side of the geomembrane to form a completely sealed whole;

(3) Evacuate a small mud pit at the construction site, put a large-diameter plastic bucket into the small mud pit to configure flocculant, then use a special flocculant mixer to quickly and fully mix water with flocculant. It is then input into the mud pipe after the flocculant is dissolved, and then the mud mixed with flocculant is poured into the multi-layer sealed geotextile bag through screw pump, After the mud is filled fully, the vacuum pump is connected for vacuum pumping;

(4) After the mud added with flocculant is drained, remove the multi-layer sealed geotextile bag from the side, take out the dry and hard mud for use, and clean the drain board and sealed geotextile bag in the horizontal drain board system for further secondary processing.

More particularly wherein when the bottom-layer sealed geotextile bag is vacuumized to make the strength reach a certain degree, the second-layer sealed geotextile bag is injected with sludge, and so on and so forth, and each membrane bag is vacuumized after injection. The said flocculant shall be mixed and prefabricated according to the formula, and then the flocculant aqueous solution and mud solution shall be mixed and stirred with the screw pump, and then poured into the multi-layer sealed geotextile bag. During vacuum pumping, the drainage time shall be controlled. The vacuumizing time for preloading of the last sealed geotextile bag can only reach 70% of that of the lower sealed geotextile bag. The moisture content of the treated solidified soil processed in this way just meets the requirements for preparing energy-saving hollow bricks. The said multi-layer sealed geotextile bag and horizontal drain board system can be placed at any position for mud drainage, and the discharged clean water can be reused.

The technical effects of the invention are as follows:

1. A traditional geotechnical bag is not made of sealing material, and the drainage mainly relies on water seepage from the geotechnical bag. The water seepage is often turbid, and easy to pollute the environment, and more importantly, the drainage efficiency is poor.

However, in this invention, gas sealing and fluid sealing is formed inside the multi-layer sealed geotextile bag, horizontal geotextile is put inside, and several drain boards are set on horizontal geotextile. A construction similar to the structure of the vacuum preloading reclamation can be formed inside the multi-layer sealed geotextile bag. A pressure difference is formed between inside and outside of the sealed geotextile bag in pumping and drainage. A pressing can be formed on the multi-layer sealed geotextile bag using the effect of atmospheric pressure, which can greatly speed up the pumping efficiency of the drain board, 30 to 40 times faster than the traditional mud dewatering speed of sealed geotextile bags, and greatly saves the time cost and economic cost.

Moreover, multi-layer seal geotextile bag in the invention adopts material of excellent tensile properties, which is not easy to wear out. Several sealed geotextile bags can be stacked, and the load pressure transmitted through the upper layer can increase the drainage rate of lower-layer sealed geotextile bag device. Combining with the sealing structure of sealed geotextile bags themselves, stacked load and atmospheric pressure can be overlaid, which can greatly increase the pressure of external side on the sealed geotextile bag, thus greatly improving the pumping and drainage efficiency;

Finally, the drain boards are attached to or wrapped in geotextiles, which filters the incoming water and makes the water pumped out cleaner.

2. A layer of geomembrane is wrapped on the outside of the multi-layer sealed geotextile bag, which not only ensures the tightness of the sealed geotextile bag device and speeds up the drainage rate, but also prevents the fine particles in the mud from seeping out through the sealed geotextile bag to pollute the outside of the pipe bag, so as to avoid affecting the reuse of the sealed geotextile bag. Thus, the technology can use the bag lined with geotextile or wrapped with geomembrane as the sealed geotextile bag, which is good for fetching materials locally and reducing the cost.

3. The multi-layer sealed geotextile bag device can be reused after simple treatment, which is energy-saving and environmentally friendly and saves the project cost. The volume of multi-layer sealed geotextile bag can be adjusted freely, working range is large and engineering treatment capacity is flexible. The whole multi-layer sealed geotextile bag device is manufactured in industrialized assembly line, which can effectively save cost, and the multi-layer sealed geotextile bag device has the advantages of small investment, little manpower and simple and convenient operation.

4. Multi-layer sealed geotextile bag device can be placed at any position for mud drainage, and the discharged clean water can be reused to avoid secondary pollution.

5. The waste mud after dehydration treatment can be directly fired into sintered perforated bricks, energy-saving hollow bricks and steam curing bricks. Local materials can be used for waste utilization. The fired bricks can be directly used for the making of enclosure wall of construction site or underground retaining wall, which saves costs to a certain extent. The surplus bricks can also be sold to projects in need, and certain benefits can be obtained.

6. In the invention, an intermediate frame is set in the sealed geotextile bag, a middle geotextile is fixedly set on the middle frame, the upper and lower sides of the intermediate frame are respectively fixed with the upper geotextile and the lower geotextile to form a sealed geotextile bag relying on the intermediate frame and including the upper and lower geotextile, and battens are set fixedly at the upper geotextile and the lower geotextile at the lateral opening. The corresponding sides of the said intermediate frame corresponding to the said batten are set with an upper batten groove and a lower batten groove, elastic sealing strips are set in the upper batten groove and the lower batten groove, and several bolt holes pass through the said upper batten, the intermediate frame and the lower batten. The user only needs to press the batten into the batten groove and lock it with bolts to realize the sealing of the sealed geotextile bag. After being closed, a firm sealing structure is formed, and the structure of the batten and the batten groove is also convenient to open, which can be implemented without the help of tools, convenient for repeated use, good for saving cost and improving operation efficiency.

7. The said upper geotextile and the lower geotextile are connected on only one side, the three sides of the said upper geotextile and the lower geotextile form the said lateral opening, the said batten is in a U shape, the said upper batten groove and the lower batten groove are in a U shape matching with the batten, and the structure of the U-shaped batten and batten groove can enable the whole sealed geotextile bag to be opened and lifted from three sides, which is convenient for taking out the dried soil at the later stage and improving the operation efficiency.

8. The sealed geotextile bag of the invention is composed of more than three layers of sub-bags. The adjacent sub-bags are separated by a common geotextile. Each of the sub-bags has a lateral opening. The lateral openings of the adjacent sub-bags are opposite. The opening of each sub-bag is respectively set with a batten and a batten groove. An elastic sealing strip is set in the batten groove, and several bolt holes pass through the upper batten and batten groove. A connecting piece is set at the bolt hole, the connecting piece has an outer hole and an inner hole, the screw passes through the inner hole to fix the connecting piece on the batten, both sides of each sealed geotextile bag have vertical rods, the outer hole of the connecting piece is sleeved on the vertical rod, the said vertical rod is sleeved with a counterweight block, and both sides of the counterweight block have socket holes, The vertical rod passes through the socket hole to make the counterweight accurately press down on the sealed geotextile bag. In the above structure, several sub-bags are sewn as a whole, and only one geotextile is separated from the adjacent sub-bags, which is good for effective stacking of mud and increasing the loading amount of mud. In particular, after the vertical rod is used to connect the connecting pieces on each sub-bag in series, each sealed geotextile bag composed of multiple sub-bags can be stacked high without needing to reduce the number of sealed geotextile bags layer by layer for stacking, which is good for efficiently providing stacking load, and the socket structure of connecting the bolt on the sub-bag with the vertical rod by using the connecting piece also facilitates disassembling each sub-bag, and the stable setting and effective loading can also be realized by socket connecting the counterweight on the vertical rod while applying the counterweight.

9. The above sludge drying treatment method is simple and efficient. The whole process is suitable for efficient operation of the assembly line, which can improve the purification degree of the pumped and discharged water, improve the pumping and discharging efficiency, and increase the unit sludge output of the dried sludge.

DETAILED DESCRIPTION OF THE INVENTION

Figure 1:
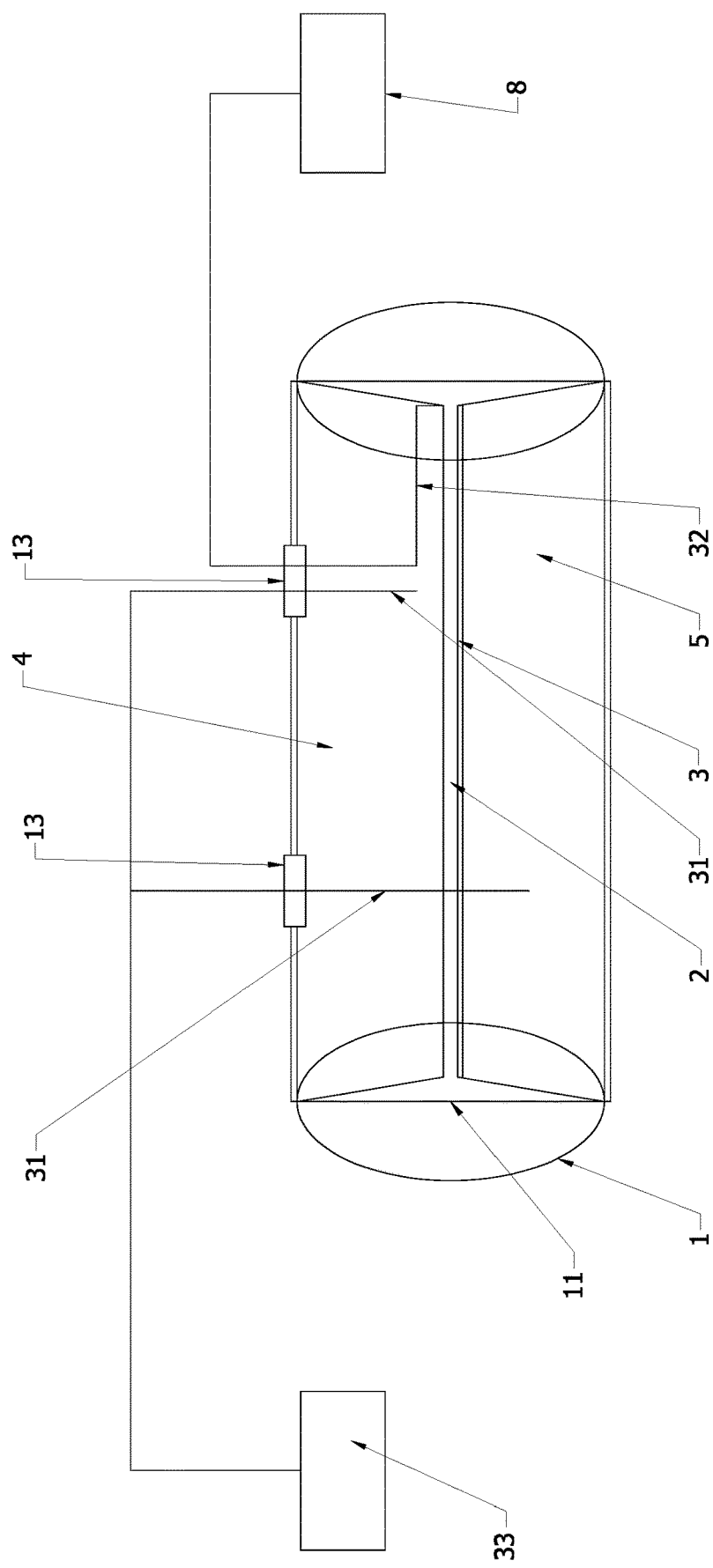
FIG. 1 is a three-dimensional structural diagram of the sludge drying system using flocculation-horizontal drain board vacuum preloading combining with multi-layer sealed geotextile bag provided in project case 1 of the invention.

The invention will be described and elaborated in further detail below in combination with the attached figures and actual project cases. The same parts are represented by the same reference marks. It should be noted that the words "front", "rear", "left", "right", "upper" and "lower" used in the following description refer to the direction in the attached figures, and the words "bottom" and "top", "inner" and "outer" refer to the direction towards or away from the geometric center of a specific component respectively.

As shown in FIG. 1-8, the sludge drying system of flocculation-horizontal drain board vacuum preloading combining with multi-layer sealed geotextile bag provided in project case 1 of the invention includes a horizontal drain board system and a sealed geotextile bag 1, that is, a geomembrane bag or a geotextile bag. The sealed geotextile bag 1 is composed of a geotextile bag lined or wrapped with a geomembrane. The sealed geotextile bag 1 can also be made of materials with high sealing performance and high strength, such as the sealed geotextile bag 1 made of modified high-strength rubber material. The multi-layer sealed geotextile bag 1 can be flexibly adjusted according to the size of the open space on the construction site. Generally, its length can be made in the range of 6-12 m and the width can be in the range of 4-8 m. The sealed geotextile bag 1 is provided with a horizontal geotextile 3 for fixing the drain board 2, the horizontal geotextile 3 is horizontally set in the middle of the sealed geotextile bag 1 and separates it into an upper cavity 4 and a lower cavity 5, and the said sealed geotextile bag 1 is provided with an upper grouting port 6 and a lower grouting port 7 respectively connected with the upper cavity 4 and the lower cavity 5. The upper grouting opening 6 and the lower grouting opening 7 are equipped with covers that can be opened and closed. The said horizontal drain board system includes a drain board 2 and a pipeline system. The said drain board 2 is pasted and fixed on the horizontal geotextile 3. The drain board 2 is set along the length direction of the sealed geotextile bag. After the said sealed geotextile bag 1 is closed, an air seal and a liquid seal are formed, that is, the upper grouting opening 6 and the lower grouting opening 7 and the lateral opening form an air seal and a liquid seal after being sealed, but only at least one end of the drain board 2 is left to be connected to the pumping device 8, i.e. the vacuum pump, through the pipeline system and through the sealed geotextile bag 1.

Figure 2:
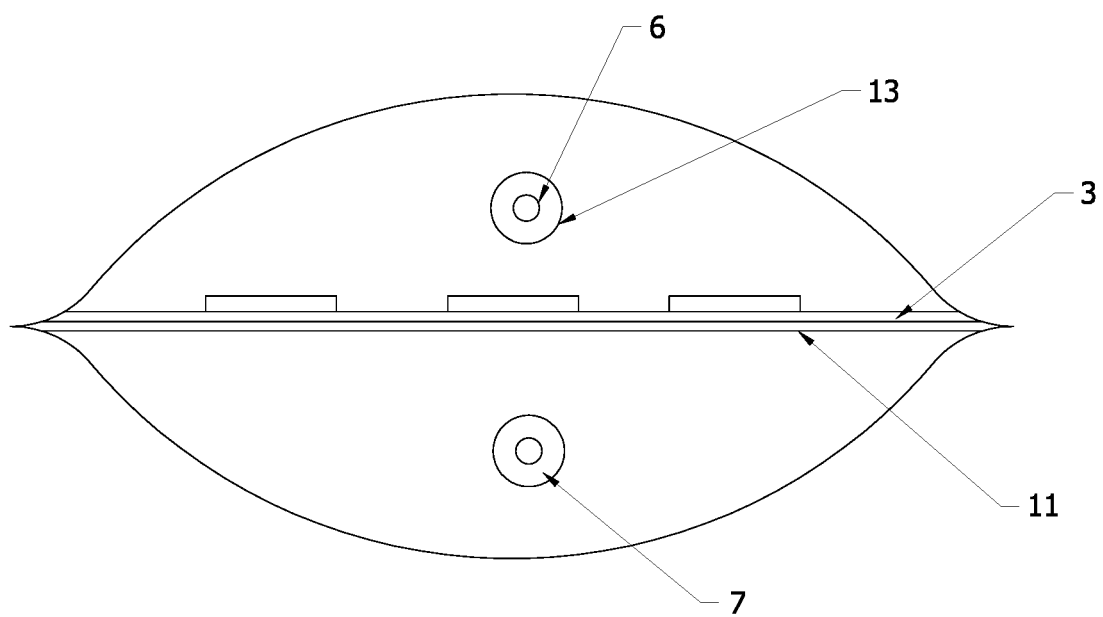
FIG. 2 is a structural sectional diagram of the sealed geotextile bag in FIG. 1, in which the drain board is set on a single-layer geotextile.
Figure 3:
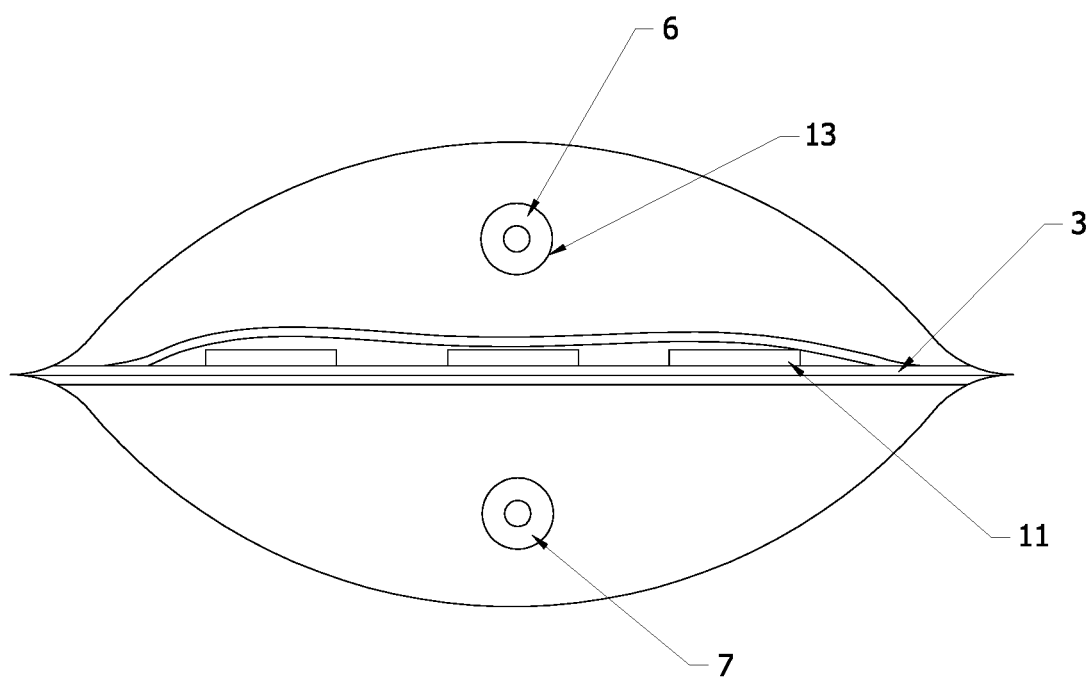
FIG. 3 is a structural sectional diagram of the sealed geotextile bag in FIG. 1, in which the drain board is set between the double-layer geotextiles.
Figure 4:
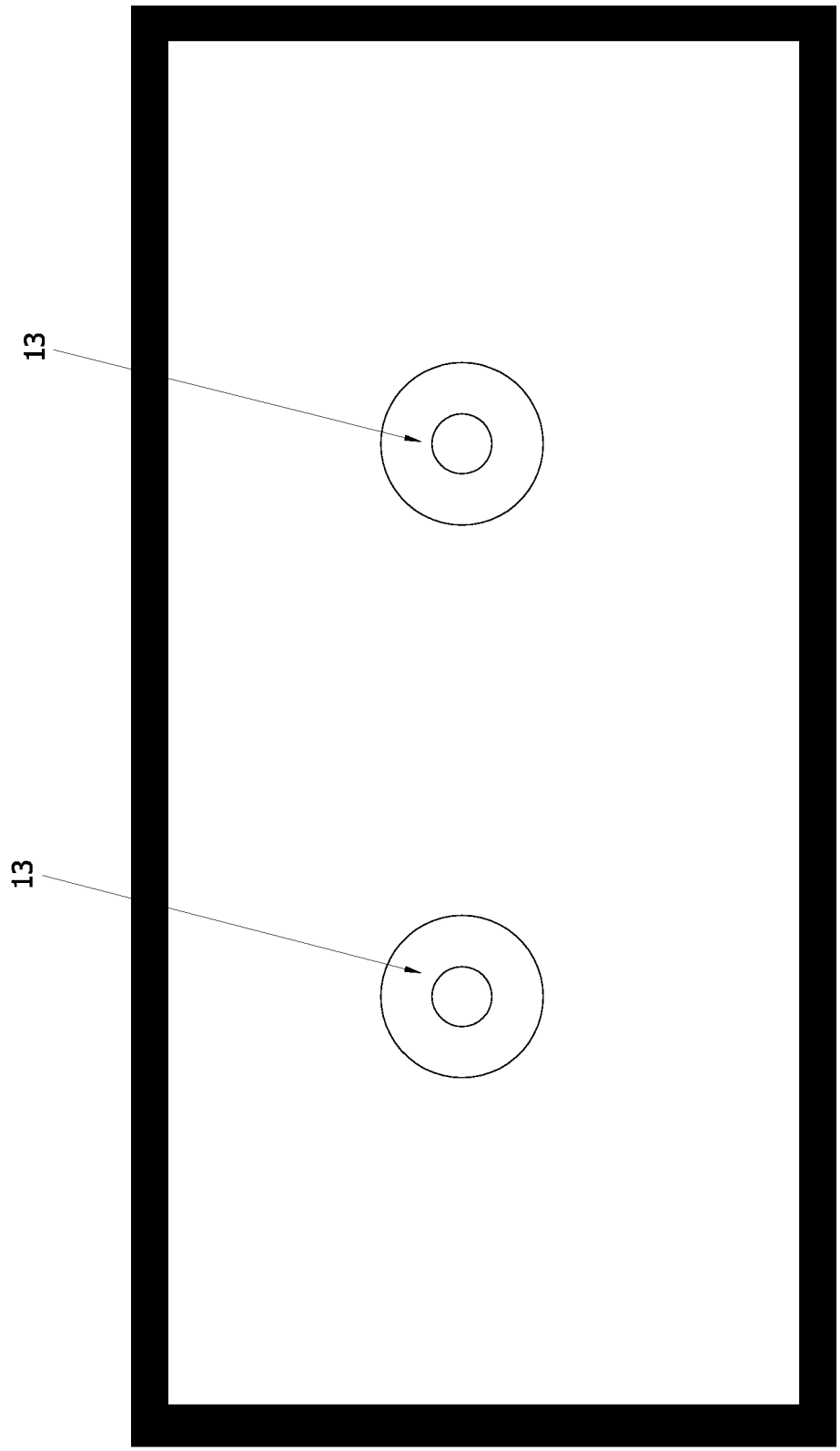
FIG. 4 is the structural diagram of the upper geotextile in FIG. 1, with an input port composed of a flange.
Figure 5:
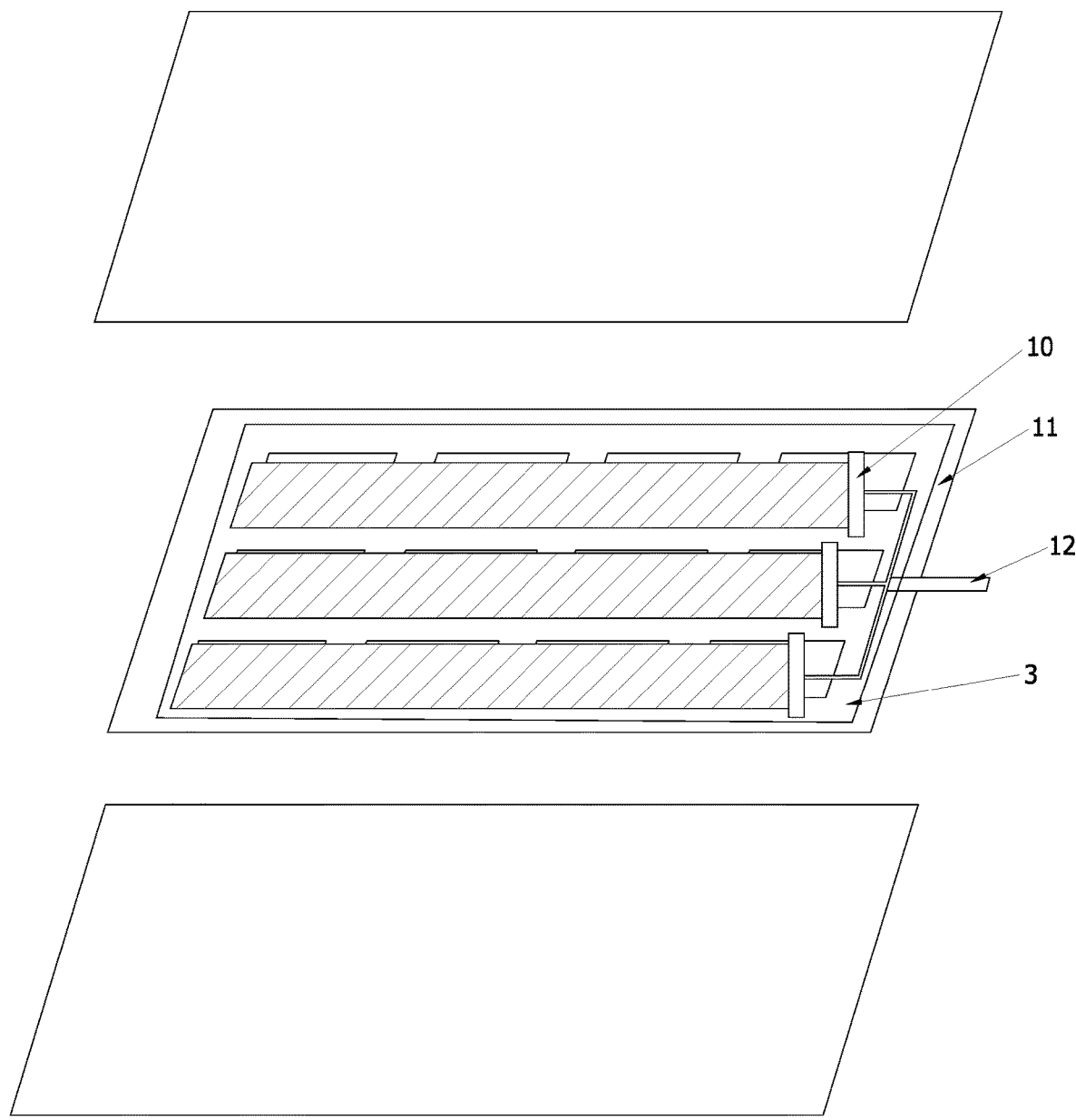
FIG. 5 is a split structure diagram of the sludge drying system of flocculation-horizontal drain board vacuum preloading combining with multi-layer sealed geotextile bag provided in project case 1 of the invention.
Figure 6:
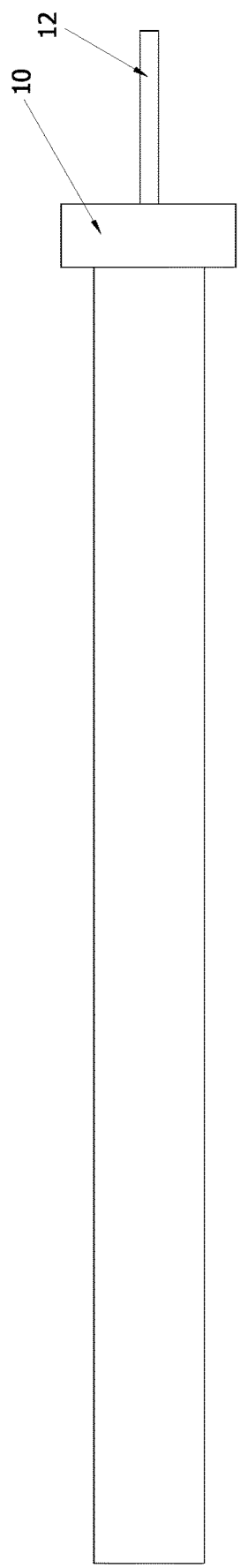
FIG. 6 is a structural diagram of the drain board and hand joint in FIG. 5.

As shown in FIG. 3, in order to improve the filtering effect, the said drain board system includes two layers of horizontal geotextiles 3, and the said drain board 2 is set between the two layers of horizontal geotextiles 3 and in the sealed geotextile bag 1. The said horizontal drain board system is composed of two layers of horizontal geotextiles 3, drain board 2, vacuum probe 9, vacuum pipe, drainage pipe and hand joint 10. The said drain board 2 is set between the two layers of horizontal geotextiles 3. The inner end of the said sealed geotextile bag 1 is connected with one end of the geogrid 11, and the other end of the geogrid 11 is connected with the outer interface of the sealed geotextile bag 1, which separates the sludge into upper and lower areas, and the drain board 2 wrapped in the horizontal geotextile 3 is fixed on the geogrid 11. One end of the horizontal geotextile 3 is connected with one end of the geogrid 11, and the other end of the geogrid 11 is connected with the outer interface of the sealed geotextile bag 1. After the geogrid 11 and the outer interface of the sealed geotextile bag 1 are sewn with a professional sewing machine, a circle of waterproof glue is wrapped on the outside to further strengthen the sealing effect. Vacuum probe 9 passes through the sealed geotextile bag 1 and enters the inner cavity. The vacuum pipe is connected with the hand joint 10. The hand joint 10 is set on the sealed geotextile bag 1 as an inlet and outlet connecting the inside and outside. The said drainage system is laid in the center of the sealed geotextile bag 1 to isolate the sealed geotextile bag 1 into upper and lower areas. The horizontal drainage system is connected with the external vacuum pump through the vacuum pipe. Or, the drain board 2 in this case can also be set on a single-layer horizontal geotextile 3 as shown in FIG. 2.

As shown in FIG. 1 and FIG. 2, there are two layout modes of drain board 2: 1. drain board 2 can also be directly set horizontally in the middle of the whole sealed geotextile bag 1 device according to a certain spacing, and then be fixed using geogrid 11; 2. Directly sew the horizontal drain board system with the sealed geotextile bag 1 and cancel the geogrid 11. For example, in the integrated drain board system equipped with geogrid 11, two complete rectangular geotextiles are wrapped in the upper and lower parts of the drain board 2, and the two geotextiles are completely sealed around with a professional sewing machine so as to form an integral structure. Because the drain board 2 wrapped with geotextile can effectively reduce the particles entering the drain board 17 to improve the drainage rate and prolong the service life. The integrated drain board system can keep the whole drain board 2 on the same plane, which has a stable structure, avoid the adverse effects caused by bending or breaking of the drain board 2, and the layout is much simpler, much manpower and material resources can be reduced, and the drain board 2 can be reused.

As shown in FIG. 1 and FIG. 2, in order to improve the filtering effect and make the water in the permeable sealed geotextile bag cleaner, a layer of geomembrane is placed inside the sealed geotextile bag 1. The geomembrane is close to the inner side of the sealed geotextile bag 1 and pasted together with a professional hot melt machine; Or, the said geomembrane wraps and seals the outside of the geotextile bag 1, so that the whole device becomes integrated structure and form a complete drainage system, thus ensuring the tightness of the device and improve the drainage performance; Or, the said sealed geotextile bag is made of high-strength impermeable and air-tight geosynthetic material, such as a modified rubber bag with enhanced elasticity. The above three structures of the sealed geotextile bag 1 can be used for the implementation of the patented method.

Figure 7:
FIG. 7 is a structural diagram of the vacuum probe and vacuum tube in FIG. 5.

As shown in FIG. 1, FIG. 2 and FIG. 7, in order to better detect the vacuum degree and improve the pumping effect, in the said horizontal drain board system, the vacuum probe 9 is fixed with the vacuum pipe, and then fixed on the drain board 2 with iron wire to measure the vacuum degree in drain board 2. One end of the said drain board 2 is fixed on the lower-layer horizontal geotextile 3, the other end is connected with the hand joint 10, which is locked together by a fixing device, the other end of the hand joint 10 is connected with the drainage pipe 12, and the drainage pipe 12 is connected with the main drainage pipe to the outside;

As shown in FIG. 1, FIG. 2, FIG. 3 and FIG. 4, for more convenient and sealed processing of joints, each said horizontal drain board system is composed of a combined structure of several drain boards 2 and hand joints 10. Two complete rectangular horizontal geotextiles 3 are wrapped in the upper and lower parts of drain board 2, and two horizontal geotextiles 3 are sewn and completely sealed with a sewing machine around to form an integrated structure.

As shown in FIG. 1-4, two flanges 13 are installed above the said sealed geotextile bag, of which the mud branch pipe 31 connected with one flange 13 leads to the lower part of the horizontal drain board system to inject sludge, and the sludge branch pipe 31 connected with the other flange 13 leads to the upper part of the horizontal drain board system. The drainage pipe 32 connecting the drain board 2 passes through the flange 13 and is connected to the external pumping device 8 for vacuum pumping. Both mud branches 31 are connected to the mud pump 33. The flange 13 includes an upper flange and a lower flange. The upper flange and the lower flange clamp the edge of the through hole at the sealed geotextile bag and form a flange connection. The flange plate can be quickly clamped and installed at the through hole of the geotextile constituting the sealed geotextile bag, and can form a quick connection structure externally. For example, if the flange plate 13 is provided with internal thread, it can form a screw connection structure with the external pipe end.

Figure 8:
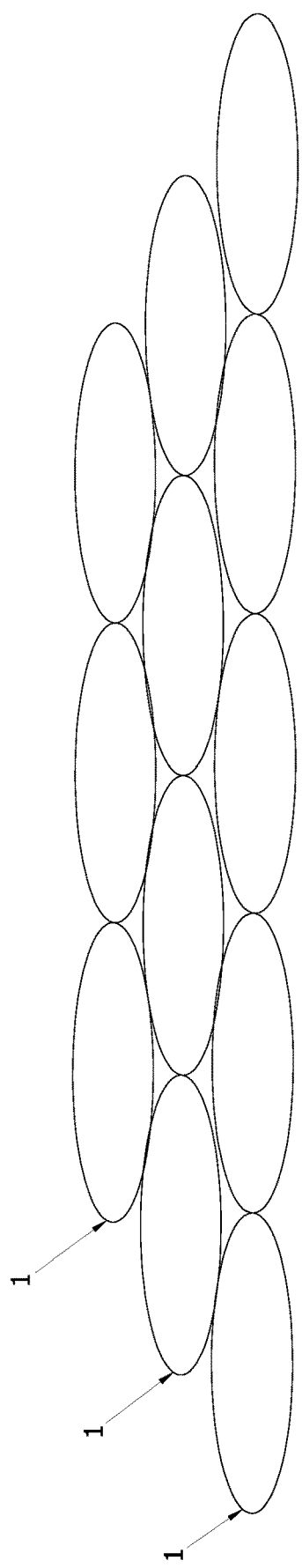
FIG. 8 is the site layout of the sludge drying system of flocculation-horizontal drain board vacuum preloading combining with multi-layer sealed geotextile bag provided in project case 1 of the invention.
Figure 9:
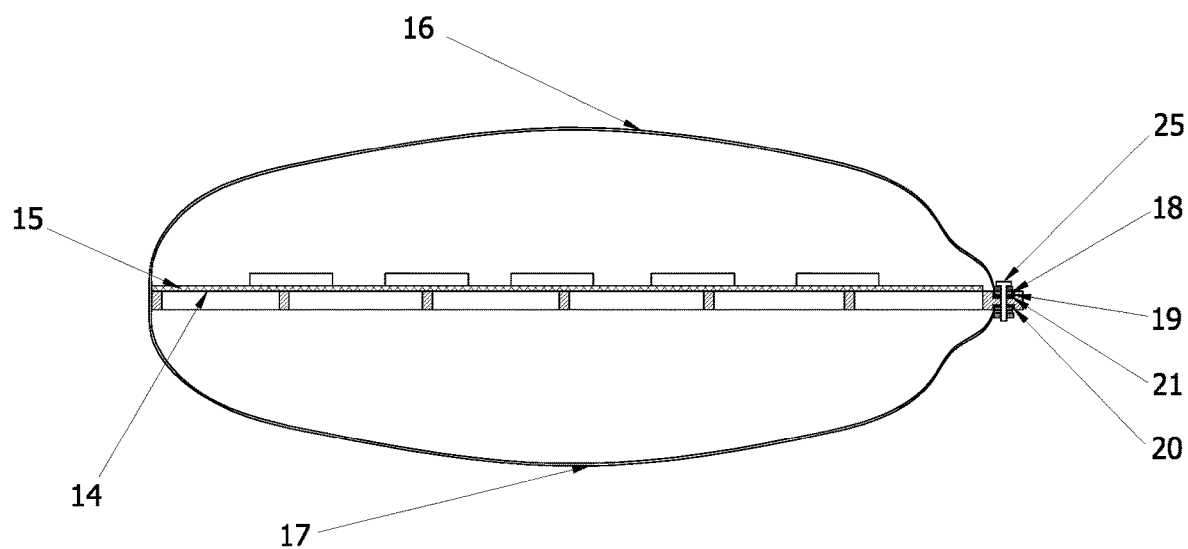
FIG. 9 is a structural sectional diagram of the sealed geotextile bag of the sludge drying system of flocculation-horizontal drain board vacuum preloading combining with multi-layer sealed geotextile bag provided in project case 2 of the invention, in which the bolt locking structure is in a locked state.
Figure 10:
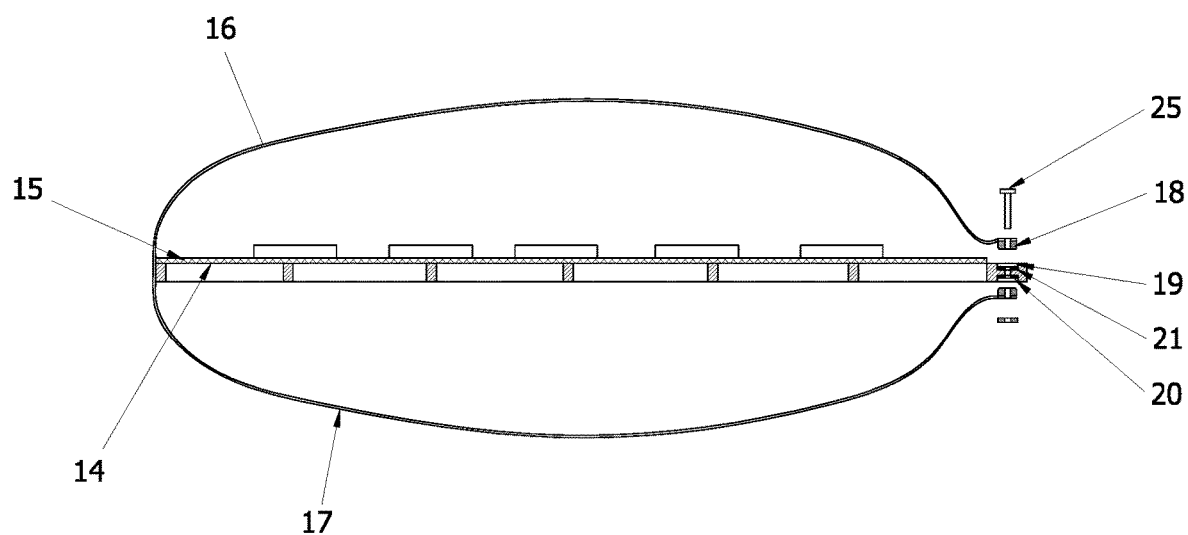
FIG. 10 is a structural sectional diagram of the sealed geotextile bag in FIG. 9, in which the bolt locking structure is in a split state.
Figure 11:
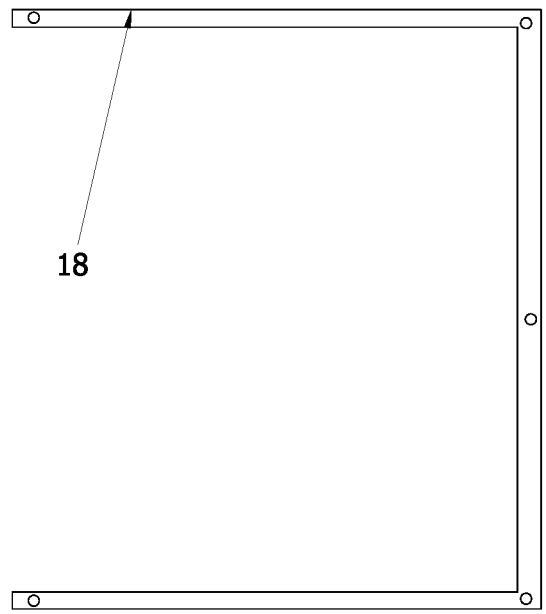
FIG. 11 is a structural diagram of the U-shaped batten provided in project case 2.
Figure 12:
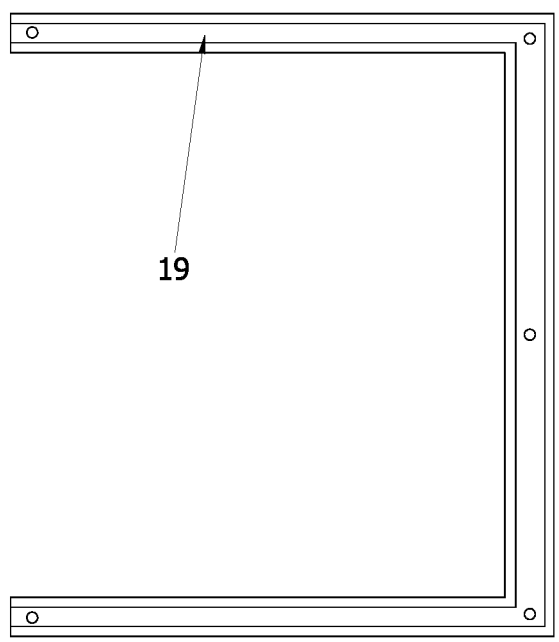
FIG. 12 is a structural diagram of the U-shaped batten groove provided in project case 2.
Figure 13:
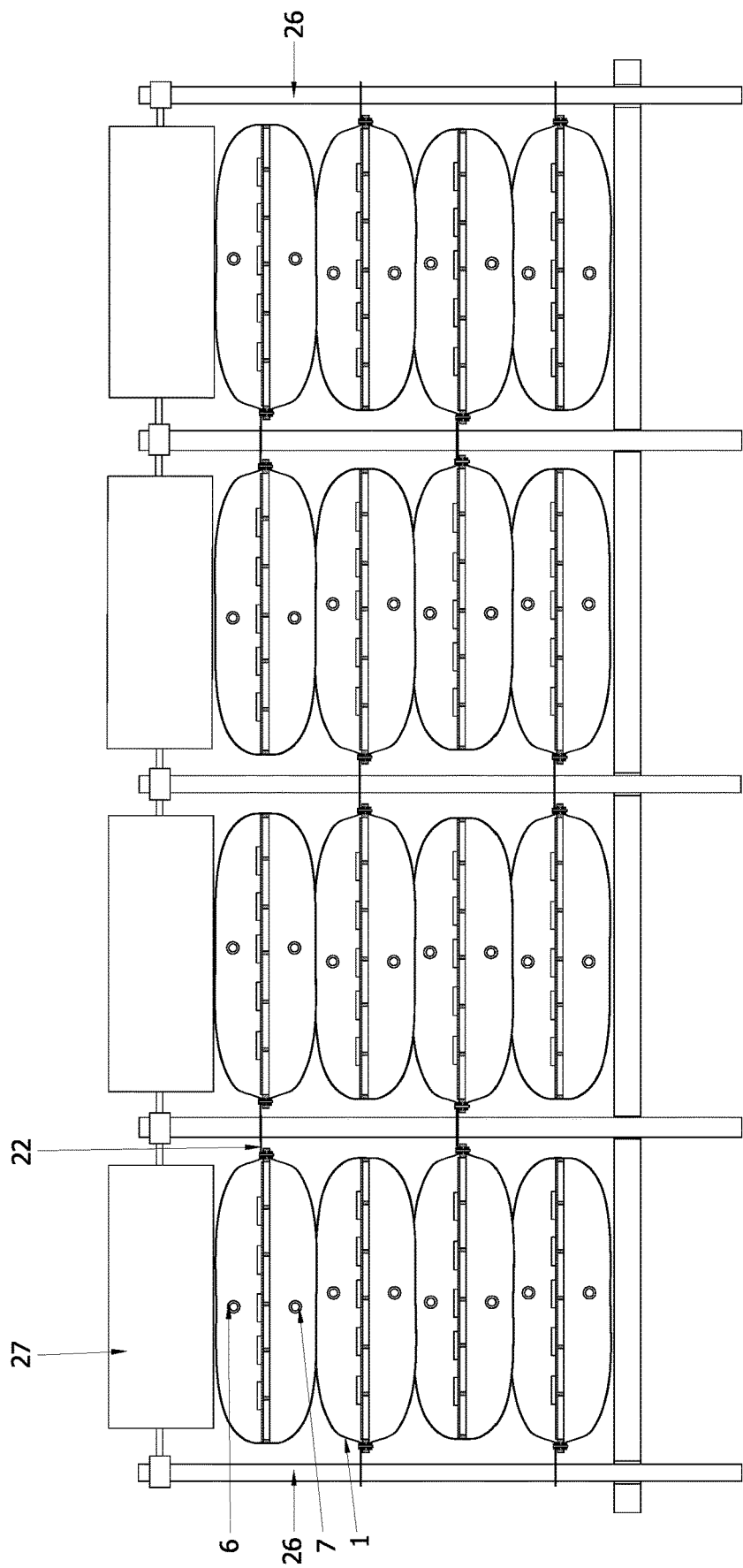
FIG. 13 is a structural diagram of the assembly and stacking state of the sludge drying system of flocculation-horizontal drain board vacuum preloading combining with multi-layer sealed geotextile bag provided in project case 2 of the invention.

As shown in FIG. 8, in order to improve the dewatering effect through stable and effective stacking, the said sealed geotextile bag 1 device can be stacked on the construction site, with five at the bottom layer, four at the second layer and three at the third layer, and so on and so forth. Grouting starts from the bottom layer. The upper and lower layers of each new sealed geotextile bag 1 are injected with sludge at the same time. After filling, the vacuum pump is connected for vacuum pumping. The multi-layer stacked sealed geotextile bag 1 forms a stacking effect on the lower structure through the self weight of the upper layers, which makes the drainage effect faster and the dehydration efficiency higher.

Project case 1 of the invention provides a sludge drying treatment method implemented by the sludge drying system of the aforesaid flocculation-horizontal drain board vacuum preloading combining with multi-layer sealed geotextile bag, and it comprises the following steps:

(1) Adopt a mechanical equipment assembly line to prefabricate the horizontal drain board system, which is made into a unified specification according to the site requirements and reserved for use;

(2) Process and make the said sealed geotextile bag 1, which is a multi-layer sealed geotextile bag. Fix the horizontal drain board system or a single horizontal drain board 2 in the middle of the sealed geotextile bag 1 by using the geogrid 11. In the preparation process of the whole device, first, seal two sealing cloth on both sides with a professional sewing machine, and leave the other two sides for placing and fixing the horizontal drain board system or a single horizontal drain board 2; Install flange 13 and mud branch pipe above the multi-layer sealed geotextile bag 1, and sleeve a layer of geomembrane on the outside after they are processed and sealed according to the required specifications, or paste the geomembrane with a professional hot melt machine on the inside of the geotextile bag to form a completely sealed whole.

(3) Excavate a small mud pit at the construction site, put a large-diameter plastic bucket into the small mud pit to configure flocculant, use a special flocculant mixer to mix water with flocculant quickly and fully, input it into the mud pipe after the flocculant is dissolved, and pour the mud mixed with flocculant into multi-layer sealed geotextile bag 1 through screw pump. After the mud is filled, connect the vacuum pump for vacuum pumping;

(4) After the mud added with flocculant is drained, disassemble the multi-layer sealed geotextile bag 1 from the side and take out the dry and hard mud for use. For example, burn it into the energy-saving hollow brick and steam curing brick at the construction site, and make use of the energy-saving hollow brick made of the treated solidified soil. The brick body has several through holes, and convex support strips are set on both sides of the said brick body. Each two bricks can be jointed. They have high strength, high density and a novel structure, and can replace the traditional wall materials (brick specification: 238 mm long, 115 mm wide, 90 mm thick; aperture is 18 mm, and quantity is 20). And clean drain board 2 and sealed geotextile bag 1 in the horizontal drain board system for further secondary processing.

The cured soil after the above treatment can also be treated as follows: add fly ash, lime and other materials to the treated cured soil, and mix, press and form it through high-pressure steam into a new wall material product-steam cured brick, which has the characteristics of neat appearance, standard size, good compressive performance, strong flexural resistance and light weight and is the most ideal material to replace solid clay brick.

In the above method, when the sealed geotextile bag 1 on the bottom layer is vacuumized to make the strength reach a certain degree, the second layer of the sealed geotextile bag 1 can be injected with sludge, and so on and so forth. After each membrane bag is injected, it is vacuumized. The said flocculant shall be mixed and prefabricated according to the formula, and then the flocculant aqueous solution and mud solution shall be mixed and stirred with the screw pump, and then poured into the multi-layer sealed geotextile bag. During vacuumizing, the drainage time shall be controlled, and sealed geotextile bag 1 for the last time is stacked so that vacuumizing time only reaches 70% of the lower-layer sealed geotextile bag. In this way, the moisture content of the cured soil after treatment can reach 80% to 100%, which just meets the requirements for preparing energy-saving hollow bricks. The multi-layer sealed geotextile bag and horizontal drain board system can be placed at any position for mud drainage, and the discharged clean water can be reused to avoid secondary pollution.

As shown in FIG. 1-8, project case 1 of the invention provides a sludge drying treatment method implemented by the sludge drying system of the above flocculation-horizontal drain board vacuum preloading combining with multi-layer sealed geotextile bags, which comprises the following steps:

(1) Firstly, prepare the horizontal drain board system in advance. Arrange several drain boards 2 equidistantly and fix them on the geotextile. The distance between adjacent rows of drain boards 2 is 40 cm. Fix one end of each drain board 2 on a section of the geotextile. The other end of the drain board 2 is connected with a hand joint 10, and each hand joint 10 is connected to drainage pipe 12 in turn. Then connect drainage pipe 12 to the main drainage pipe, and extend the other end of the drainage pipe 12 out of the geotextile. Then fix the vacuum probe 12 and the vacuum tube together, and then fix it on the drain board 2 with iron wire. Extend the other end of the vacuum tube out of the geotextile to connect the vacuum meter, so as to measure the vacuum degree of the board. Pave a layer of geotextile above the fixed the drain boards 2, and connect the four sides of the upper and lower geotextiles in a sealing way, such as using hot melt adhesive for sealing;

(2) Make a multi-layer geomembrane bag device. First, seal both sides of the sealed geotextile bag 1 with a professional sewing machine, leave the other two sides for placing and fixing the horizontal drain board system or a single horizontal drain board 2 prepared in advance, and then fix one side on the horizontal drain board system and the other side on the multi-layer sealed geotextile bag 1 with the geogrid 11. After the horizontal drain board system is fixed, place the flange plate 13 in the center of the horizontal drain board system, pass through the whole horizontal drain board system and insert the mud branch pipe 31 into the flange plate 13, and fix it with waterproof glue, which is used for pouring mud to the lower position of the horizontal drain board system;

(1) Then, open two holes at the upper position of the multi-layer sealed geotextile bag 1, and install two flange plates 13. Connect one of flange plate 13 with the mud branch pipe 31 penetrating out of the horizontal drain board system, and the other flange plate 13 with a mud branch pipe 31 again and then insert it into the upper position of the horizontal drain board system. At the same time, take out the main drainage pipe and vacuum pipe inserted in the horizontal drain board system from the flange, and connect them to a vacuum pump and a vacuum gauge respectively. Connect two mud branch pipes 31 respectively to the mud main pipe, and connect the mud main pipe to the mud pump 33;

(4) After the internal components of the multi-layer sealed geotextile bag 1 are installed, seal the other unsealed sides with a professional sewing machine, then wrap a layer of geomembrane on the outermost layer, or paste the geomembrane on the inner side of the sealed geotextile bag 1 with a professional hot-melt machine, and seal the outer side of the geomembrane with waterproof glass glue, so that the whole of the multi-layer sealed geotextile bag 1 is changed into a completely sealed whole;

(5) Connect the mud main pipe to the mud pump 33, and the main drainage pipe to the pumping device 8, and the installation of the whole of the multi-layer sealed geotextile bag 1 is completed by now. Then mud can be poured at this time. First pour the lower-layer mud to a certain height, and then pour the upper-layer mud until it is full, and then perform vacuum pumping and drainage. At the same time, the vacuum gauge can detect the vacuum in the recording board at any time to know the sealing effect of the whole of the sealed geotextile bag 1;

(6) When the strength of the bottom-layer sealed geotextile bag 1 reaches a certain degree by vacuuming, that is, when the height decreases by about 30%, the second sealed geotextile bag 1 can be grouted, and so on and so forth, and stacked in five layers. Each additional layer will form a load pressure on the lower-layer sealed geotextile bag 1, which can promote the accelerated drainage of the lower-layer drainage body;

(7) When a drainage cycle is over, about 70% of the water can be discharged. At this time, cut the multi-layer sealed geotextile bag 1 along the side to take out the dry and hard waste mud and horizontal drain board system. The waste mud can be used for sintering perforated bricks, energy-saving hollow bricks and steam curing bricks at the construction site, After taking out the drain board 2 inside the horizontal drain board system, wash it, cut the remaining of the sealed geotextile bag 1 and wash it. These can be reused to meet the requirements of energy conservation and environmental protection.

As shown in FIG. 9-13, project case 2 of the invention is basically the same as project case 1, except that the sealed geotextile bag 1 is set with an intermediate frame 14, intermediate frame 14 is made of high-strength plastic, which is mainly used for sewing geotextiles and fixing the drain boards 2, and the intermediate frame 14 is fixedly set with the intermediate geotextile 15. The upper and lower sides of the intermediate frame 14 are respectively fixed with the upper geotextile 16 and the lower geotextile 17. At least one side between the said upper geotextile 16 and the lower geotextile 17 is set with a lateral opening that can be opened and closed, and the upper geotextile 16 and the lower geotextile 17 at the lateral opening are fixedly set with the batten 18. The corresponding sides of the said intermediate frame 14 is set with the upper batten groove 19 and the lower batten groove 20 corresponding to the batten. An elastic sealing strip 21 is set in the upper strip groove 19 and the lower strip groove 20, and several bolt holes pass through the upper batten 18, the intermediate frame 14 and the lower batten 18. The said upper geotextile 16 and lower geotextile 17 are connected on only one side, the three sides of the said upper geotextile 16 and the lower geotextile 17 form the lateral opening, the said batten 18 is in a U shape, the said upper batten groove 19 and the lower batten groove 20 are in a U shape matching batten 18, and the structure of the U-shaped batten 18 and the batten groove can enable the whole of sealed geotextile bag 1 to be opened and lifted from three sides, which facilitates taking out the dried soil in the later stage and improving the operation efficiency. The said sealed geotextile bag 1 is composed of more than three layers of sub-bags, and the adjacent sub-bags are separated by a common geotextile. Each sub-bag has a lateral opening, and the lateral openings of the adjacent sub-bags are opposite. The opening of each bag is respectively set with the batten 18 and a batten groove, the batten groove is set with the elastic sealing strip 21. Several bolt holes pass through the said upper batten 18 and the batten groove, the bolt holes are set with a connecting piece 22, and the connecting piece 22 has an outer hole 23 and an inner hole 24. The screw 25 passes through the inner hole 24 to fix the connecting piece 22 on the batten 18. Both sides of each sealed geotextile bag 1 are equipped with a vertical rod 26, and the outer hole 23 of the connecting piece 22 is sleeved on the vertical rod 26. The said vertical rod 26 is sleeved with a counterweight 27, both sides of the counterweight 27 have socket holes, and the vertical rod 26 passes through the socket holes to make the counterweight 27 accurately press down on the sealed geotextile bag 1. In the above structure, several sub-bags are sewn as a whole, and only one geotextile is separated from the adjacent sub-bags, which is good for effective stacking of mud and increasing the loading amount of mud. In particular, after the vertical rod 26 is used to connect the connecting pieces on each sub-bag in series, each sealed geotextile bag 1 composed of several sub-bags can be stacked high without needing to reduce the number of sealed geotextile bags layer by layer for stacking, which is good for providing stacking load efficiently, and the socket structure of connecting the connecting piece 22 with the bolt on the sub-bag and the vertical rod 26 is also convenient to disassemble each sub-bag, and when the counterweight 27 is applied, stable setting and effective loading can be realized by socket connection on the vertical rod 22.

As shown in FIG. 9-15, a sludge drying treatment method implemented by the sludge drying system of the above flocculation-horizontal drain board vacuum preloading combining with multi-layer sealed geotextile bag is provided, which comprises the following steps:

(1) Adopt a mechanical equipment assembly line to prefabricate the horizontal drain board system, which is made into a unified specification according to the site requirements and reserved for use;

(2) Process and make the said sealed geotextile bag 1. The said sealed geotextile bag 1 is composed of more than three layers of sub-bags. The adjacent sub-bags are separated by common geotextile. Each sub-bag has a lateral opening. The lateral openings of the adjacent sub-bags are opposite. Bolts are used to pass through the connecting piece, the upper batten 18, the intermediate frame 14 and the lower batten 18. The said vertical rod 26 is erected on the base, and the said connecting piece 22 is socket connected on the vertical rod 26. The vertical rod 26 and the base adopt a detachable plug-in structure, such as adopting threaded connection, or an unlocked locking structure, to be connected on the base vertically. The detachable connection technology of the vertical rod 26 is a conventional technical means, which will not be repeated here.

(3) Excavate a small mud pit at the construction site, put a large-diameter plastic bucket into the small mud pit to configure flocculant, use a special flocculant mixer to mix water with flocculant quickly and fully, input it into the mud pipe after the flocculant is dissolved. Connect the screw pump respectively with the upper and lower flanges 13 through two pipes, start the screw pump to pour the slurry mixed with flocculant into the upper and lower cavities of the sealed geotextile bag, and connect the vacuum pump to vacuumize after the slurry is filled;

(4) Put a counterweight 27 above the sealed geotextile bag 1, and socket connect both ends of the counterweight 27 on the vertical rod 22;

(5) After the mud added with flocculant is drained, unlock the bolts, remove the bolts layer by layer from top to bottom to open the lateral outlet of the sealed geotextile bag 1 to take out the dried soil. During disassembly, pull out the batten 18 from the batten groove, disassemble the sealed geotextile bag 1 from the side, and take out the dry and hard mud for processing and/or geotextile landfill.

Figure 14:
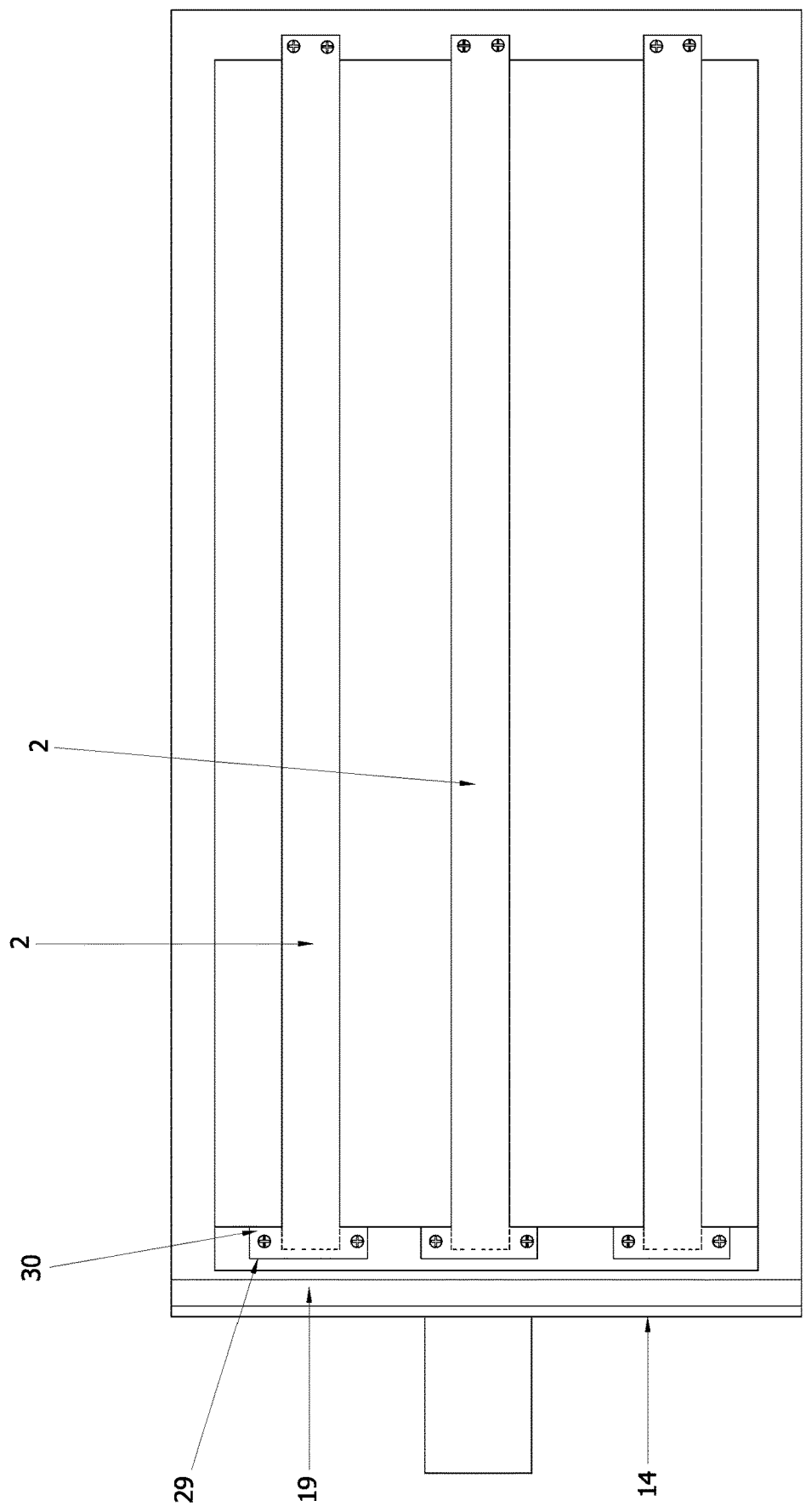
FIG. 14 is a structural diagram of the intermediate frame of the sludge drying system of flocculation-horizontal drain board vacuum preloading combining with multi-layer sealed geotextile bag provided in project case 3 of the invention, in which a drain board is installed.
Figure 15:
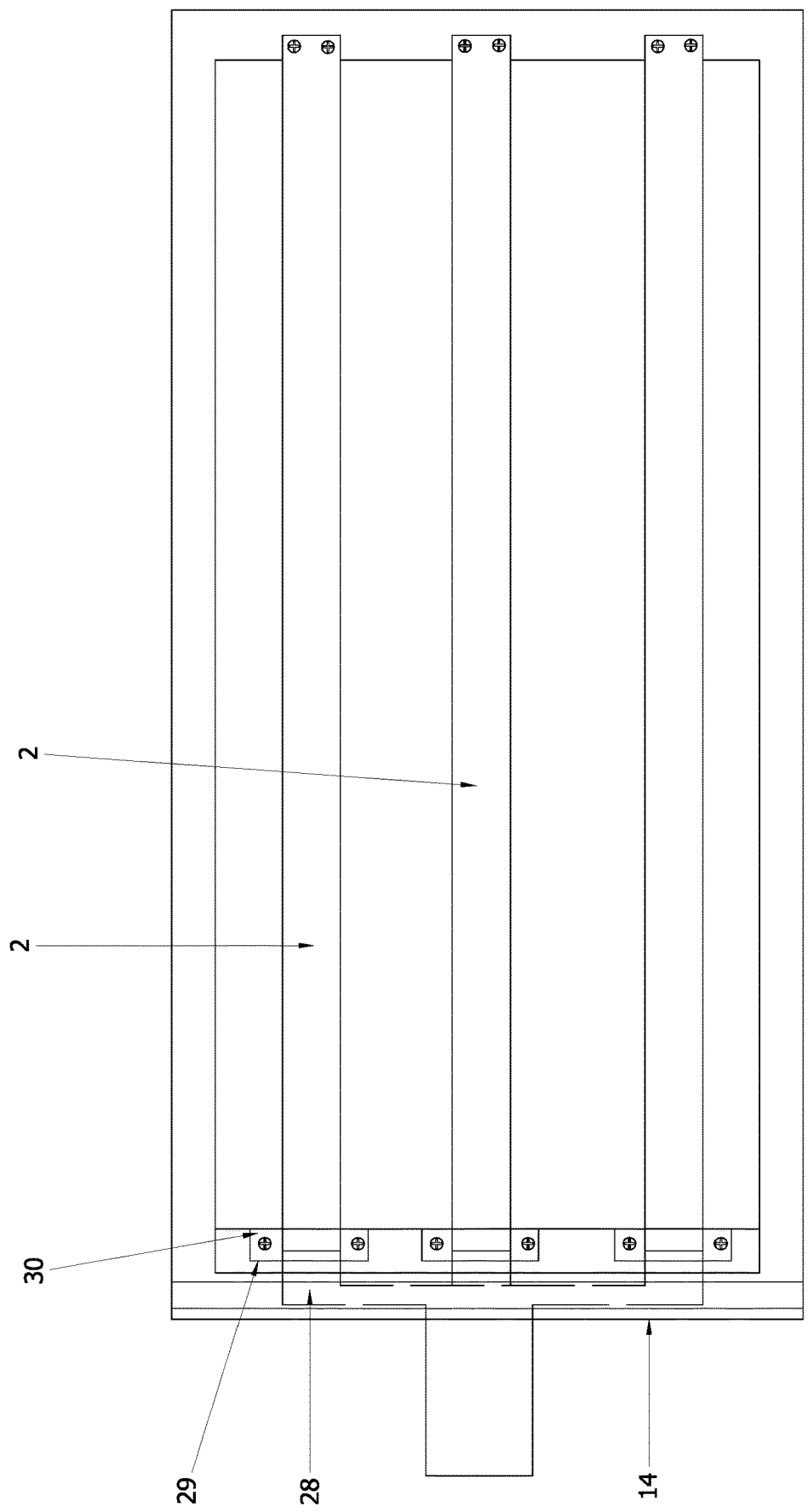
FIG. 15 is a perspective view of FIG. 14, showing the drainage channel outside the drain board.

As a further addition, as shown in FIG. 14-15, project case 3 of the invention is basically the same as project case 1, except that the fixing structure and pumping channel of the intermediate frame 14 and the drain board 2 are different: the drainage frame 14 is provided with an inner channel 28 and a fixing end of drain board 29, and the fixing end of the drain board 29 is connected with the water outlet channel connected to the drainage frame 14 through the inner channel 28. The fixing end of the drain board 29 includes a fixing plate 30, which is connected with the drainage frame 14 with bolts and fixes and clamps one end of the drain board 2. One end of the drain board 2 is connected with the inner end of the inner channel 28, and the other end is fixed at the inner end of the drainage frame 14. During installation, the batten 18 is pressed into the batten groove on the drainage frame 14, and the drain board 2 is connected through the water outlet channel connected with the drainage frame 14, thus forming the ability of external pumping and drainage.

The invention claimed is:

1. A sludge treatment system using a horizontal drain board with a multi-layer geotextile bag, comprising:
   a horizontal drain board system and a geotextile bag; wherein
   a horizontal geotextile for fixing a drain board is disposed in the geotextile bag, which is horizontally placed in the middle of the geotextile bag and separates the geotextile bag into an upper cavity and a lower cavity;
   the geotextile bag includes an upper grouting port and a lower grouting port connected to the upper cavity and the lower cavity, respectively;
   the upper grouting port and the lower grouting port are equipped with covers that can be opened and closed,
   the horizontal drain board system includes the drain board and a pipeline system;
   the drain board is attached and fixed on the horizontal geotextile, and the geotextile bag forms an air seal and a liquid seal when closed;
   at least one end of the drain board is connected to a pumping and drainage device through the pipeline system;
   wherein an intermediate frame is disposed inside the geotextile bag, an intermediate geotextile is fixedly arranged on the intermediate frame, upper and lower sides of the intermediate frame are respectively fixed with an upper geotextile and a lower geotextile;
   at least one side between the upper geotextile and the lower geotextile is provided with a lateral opening, the upper geotextile and the lower geotextile at the lateral opening are fixedly provided with battens, the corresponding side of the intermediate frame is provided with upper and lower batten grooves corresponding to the battens, elastic sealing strips are arranged in the upper and lower batten grooves, and a plurality of bolt holes penetrate through the upper batten, intermediate frame and lower batten.

2. The sludge treatment system using horizontal drain board with the multi-layer geotextile bag according to claim 1, wherein the horizontal drain board system comprises two layers of horizontal geotextiles, and the drain board is disposed between the two layers of horizontal geotextiles and is located at a center of the geotextile bag.

3. The sludge treatment system using horizontal drain board with the multi-layer geotextile bag according to claim 2, wherein the horizontal drain board system comprises a vacuum probe, a vacuum pipe, a drainage pipe and a hand-shaped joint, an inner end of the geotextile bag is connected to one end of a geogrid, and another end of the geogrid is connected to an outer interface of the geotextile bag, isolating the sludge into upper and lower regions, the drain board wrapped in the horizontal geotextile is fixed on the geogrid, one end of the horizontal geotextile is connected to one end of the geogrid, and the other end of the geogrid is connected to the outer interface of the geotextile bag;

the geogrid is sewn to the outer interface of the geotextile bag using a sewing machine, a circle of waterproof adhesive is wrapped around the outside;

the vacuum probe penetrates the geotextile bag into an inner cavity of the geotextile bag, the vacuum pipe is connected to the hand-shaped joint, which is installed on the geotextile bag, serving as a passage for connecting the inside and outside of the geotextile bag;

a drainage system is laid in the center of the geotextile bag, isolating the geotextile bag into upper and lower regions.

4. The sludge treatment system using horizontal drain board with the multi-layer geotextile bag according to claim 1, wherein a layer of geomembrane is disposed inside the geotextile bag, the geomembrane closely adheres to an inner side of the geotextile bag and is bonded together using a hot melt machine;

the geomembrane wraps around the outside of the geotextile bag, making the entire device an integrated whole, thereby forming a complete drainage system to ensure the sealing performance of the device and improve the drainage performance;

the geotextile bag is made of high-strength waterproof and breathable geosynthetic material.

5. The sludge treatment system using horizontal drain board with the multi-layer geotextile bag according to claim 4, wherein in the horizontal drain board system, the vacuum probe is fixed together with the vacuum pipe, and then fixed to the drain board with iron wire;

one end of the drain board is fixed to the horizontal geotextile, and another end of the drain board is connected to the hand-shaped joint, which is locked together with the drain board using a fixing device, and one end of the hand-shaped joint is connected to a drainage pipe, and the drainage pipe is connected to a main drainage pipe to the outside of the geotextile bag;

each horizontal drain board system is composed of a plurality of the drain boards and hand-shaped joints; upper and lower parts of each of the plurality of drain board are wrapped with two complete rectangular horizontal geotextiles, and the two horizontal geotextiles are sewn and completely sealed around the edges using a sewing machine, forming an integral structure;

two flanges are installed on top of the geotextile bag, one flange is connected to a mud branch pipe leading to a lower part of the horizontal drain board system for injecting sludge, and the other flange is connected to a sludge branch pipe leading to an upper part of the horizontal drain board system for injecting slurry; the flanges include an upper flange and a lower flange; the upper flange and the lower flange clamp the edge of a through hole of the geotextile bag to form a flange connection.

6. The sludge treatment system using horizontal drain board with the multi-layer geotextile bag according to claim 1, wherein only one side of the upper geotextile and the lower geotextile is connected, the other three sides of the upper geotextile and the lower geotextile form the lateral opening, the battens are U-shaped, and the upper batten groove and the lower batten groove are U-shaped to match the battens;

the geotextile bag is composed of more than three layers of sub-bags, the adjacent sub-bags are separated by a common geotextile, each of the sub-bags has a lateral opening, and the lateral openings of the adjacent sub-bags are opposite to each other.

7. The sludge treatment system using horizontal drain board with the multi-layer geotextile bag according to claim 6, wherein the plurality of bolt holes are equipped with connectors, each connector has an outer hole and an inner hole, the inner hole is passed through by a bolt to fix the connector to a pressing strip, vertical rods are arranged on both sides of each geotextile bag, the outer hole of the connector fits onto the vertical rod, the vertical rod is fitted with a weight block, the weight block has coupling holes on both sides, the vertical rod passes through the coupling holes to ensure the weight block presses down on the geotextile bag.

* * * * *